United States Patent [19]

Braus

[11] 4,311,825
[45] Jan. 19, 1982

[54] ACETAL POLYMER

[75] Inventor: Harry Braus, Cincinnati, Ohio

[73] Assignee: National Distillers & Chemical Corp., New York, N.Y.

[21] Appl. No.: 170,340

[22] Filed: Jul. 21, 1980

[51] Int. Cl.$^3$ ............................................... C08G 4/00
[52] U.S. Cl. .................................... 528/232; 528/230; 528/242
[58] Field of Search ....................... 528/230, 232, 242

[56] References Cited

U.S. PATENT DOCUMENTS

| 2,071,252 | 2/1937 | Carothers | 528/230 |
| 2,888,492 | 5/1959 | Fischer et al. | 526/270 X |
| 3,232,907 | 2/1966 | Reinhardt | 528/230 |
| 3,436,375 | 4/1969 | McAndrew | 528/230 |
| 3,519,696 | 7/1970 | Cherdon et al. | 528/232 |

Primary Examiner—Lucille M. Phynes
Attorney, Agent, or Firm—Kenneth D. Tremain

[57] ABSTRACT

A novel, water-soluble acetal polymer is prepared by reacting a hydroxyl-containing aldehyde with a glycol in an acid reaction medium. The acetal polymer is useful as a dispersing agent for other polymers and as a reactant for the preparation of polyurethane resins.

11 Claims, No Drawings

ACETAL POLYMER

BACKGROUND OF THE INVENTION

1. Field of the Invention

This invention relates to polymers prepared from aldehydes and, more particularly, to acetal polymers and processes for preparing the same.

2. Description of the Prior Art

The reaction of a hydroxyl-containing aldehyde with a glycol in the presence of acid to provide a cyclic acetal is known from, among others, U.S. Pat. No. 2,888,492. According to this patent, 3-hydroxybutyraldehyde is reacted with trimethylene glycol to provide 2-(2-hydroxypropyl)-1,3-dioxolane which is then reacted with at least an equimolar amount of water and a superatmospheric pressure of hydrogen in the presence of a hydrogenation catalyst to provide 1,3-butanediol and the starting trimethylene glycol. It appears from this patent that the foregoing dioxolane derivative as well as the other dioxolanes disclosed therein do not undergo polymerization.

SUMMARY OF THE INVENTION

In accordance with the present invention, it has been very suprisingly discovered that a hydroxyl-containing aldehyde can be reacted with glycol in the presence of strong acid to provide a water soluble acetal polymer whose structure has as yet not been definitely determined. The overall reaction (with a speculative structure being assigned to the polyacetal) can be represented as follows:

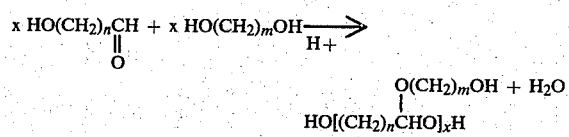

wherein n is from 1 to about 6, m is from 2 to about 10 and x is from about 5 to about 100. Regardless of what may in fact be the true structural definition of the acetal polymers herein, the foregoing structure is offered by way of a possible explanation only and is not to be taken as limiting the invention in any way.

The acetal polymers of this invention are useful as dispersing agents for other polymers and can be reacted with polyisocyanates to provide thermosetting polyurethane resins having wide commercial application.

DESCRIPTION OF THE PREFERRED EMBODIMENTS

Among the hydroxyl-containing aldehydes which can be reacted with glycol in accordance with this invention are included glycolaldehyde which is preferred, 3-hydroxypropionaldehyde, 4-hydroxybutyraldehyde, and so forth. The useful glycols are selected from the saturated aliphatic glycols and include the preferred glycol, ethylene glycol, 1,3-propanediol, 1,4-butanediol, 1,5-pentanediol, and the like.

While the hydroxyl-containing aldehyde and glycol can be reacted in stoichiometric proportions, i.e., in equimolar quantities, it is preferred to employ an excess of glycol, e.g., from about 0.1 to about 10 times an excess of the stoichiometric amount.

The reaction herein is carried out in the presence of acid, preferably in a pH range of from about 2.0 to about 6.5, and more preferably, in a pH range of from about 3.0 to about 6.0. Acids which can be used to achieve such levels of pH include hydrochloric, phosphoric, sulfuric, paratoluenesulfonic, acetic, trichloroacetic and oxalic acids. It is generally preferred to carry out the polymerization in an inert organic solvent at elevated temperature, e.g., from about 50° C. to about 200° C., accompanied by reflux of the solvent. Hydrocarbon solvents such as pentane, hexane, heptane and benzene are entirely suitable for use in the foregoing process.

The following example is illustrative of the acetal polymer of this invention and its manner of preparation.

EXAMPLE

The following were introduced into a 250 ml. flask equipped with magnetic stirrer and thermometer:

| | |
|---|---|
| Glycolaldehyde | 60.05 g (1 mole) |
| Ethylene glycol | 62.07 g (1 mole) |
| Heptane | 50 ml |
| Para-toluenesulfonic acid | 5 g |

A 10-plate distilling column was attached to the flask and the whole was heated under total reflux for 2 hours. A Barrett water trap of 25 ml capacity was then attached to the top of the distilling column and distillation begun. The water was quantitatively removed by the heptane and the return heptane from the Barrett water trap provided a good reflux ratio in the column. The largest part of the reaction mixture was an undistillable, clear, viscous, water-soluble polymer believed to possess the structure:

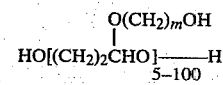

Analysis indicated the additional presence of small quantities of 2-hydroxymethyl-1,3-dioxolane and unreacted ethylene glycol.

What is claimed is:

1. A process for preparing a water-soluble acetal polymer which comprises reacting a hydroxyl-containing aldehyde and a glycol in the presence of an acid to provide the acetal polymer.

2. The process of claim 1 wherein the hydroxyl-containing glycol is represented by the formula

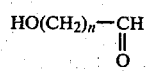

wherein n is from 1 to about 6.

3. The process of claim 2 wherein the hydroxyl-containing aldehyde is glycolaldehyde.

4. The process of claim 1 wherein the glycol is represented by the formula

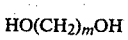

wherein m is from 2 to about 10.

5. The process of claim 4 wherein the glycol is ethylene glycol.

6. The process of claim 1 wherein the acid is selected from the group consisting of hydrochloric, phosphoric, sulfuric, para-toluenesulfonic, acetic, trichloroacetic and oxalic acids.

7. The process of claim 6 wherein the pH of the reaction medium is in the range of from about 2.0 to about 6.5.

8. The process of claim 7 wherein the pH of the reaction medium is in the range of from about 3.0 to about 6.0.

9. The process of claim 1 wherein the reaction is carried out at a temperature of from about 50° to about 200° C.

10. The process of claim 1 wherein the reaction is carried out in an inert hydrocarbon solvent.

11. A process for preparing a water-soluble acetal polymer of the formula $$\text{HO}[(CH_2)_2\overset{\overset{\displaystyle O(CH_2)_2OH}{|}}{C}HO]_{\overline{5-100}}\text{H}$$

which comprises reacting glycolaldehyde with ethylene glycol in the presence of acid to provide the acetal polymer.

* * * * *